United States Patent [19]

Hoshino et al.

[11] Patent Number: 4,828,613
[45] Date of Patent: May 9, 1989

[54] POWDERY RAW MATERIAL FOR MANUFACTURING ANODES OF FUEL CELLS

[75] Inventors: Koji Hoshino; Fumio Nouda; Seiro Yahata, all of Ohmiya, Japan

[73] Assignees: Mitsubishi Kinzoku Kabushiki Kaisha; Mitsubishi Electric Corporation, both of Tokyo, Japan

[21] Appl. No.: 86,402

[22] Filed: Aug. 17, 1987

[30] Foreign Application Priority Data

Sep. 1, 1986 [JP] Japan .................. 61-205375

[51] Int. Cl.$^4$ .................. B22F 9/08; C22C 19/03
[52] U.S. Cl. .................. 75/251; 420/460
[58] Field of Search .................. 420/460; 75/251

[56] References Cited

U.S. PATENT DOCUMENTS

| | | | |
|---|---|---|---|
| 1,628,190 | 5/1927 | Raney | 420/460 |
| 2,071,645 | 2/1937 | McNeil | 420/460 |
| 3,291,642 | 12/1966 | Jung et al. | 75/251 |
| 4,247,604 | 1/1981 | Marianowski et al. | 429/40 |
| 4,348,434 | 9/1982 | Kammer | 75/251 |
| 4,659,379 | 4/1987 | Singh et al. | 75/234 |

FOREIGN PATENT DOCUMENTS

| | | | |
|---|---|---|---|
| 1168090 | 4/1964 | Fed. Rep. of Germany | 420/460 |
| 61-24152 | 2/1986 | Japan | |
| 1157699 | 7/1986 | Japan | 420/460 |

Primary Examiner—L. Dewayne Rutledge
Assistant Examiner—David Schumaker
Attorney, Agent, or Firm—Frishauf, Holtz, Goodman & Woodward

[57] ABSTRACT

A powdery raw material for manufacturing an anode of a fuel cell comprises a powder of a nickel-base alloy consisting essentially of 0.5–10 percent by weight aluminum, and the balance of nickel and inevitable impurities, and having a mean grain size of 3–20 microns. The nickel-base alloy powder may contain 0.01–1.0 percent by weight oxygen, and/or may have an apparent density of 0.5–3.5 g/cm$^3$, and a specific surface area of at least 0.12 m$^2$/g. Advantageously, the nickel-base alloy powder is formed by means of water-atomization under a condition that the water injection pressure is 400 Kg/cm$^2$, and the specific water quantity is 0.02–0.2 m$^3$/Kg, the thus manufactured anodes exhibit initial anode characteristics as excellent as those of conventional anodes, and possess such excellent high-temperature creep strength and sintering resistance, thereby exhibiting excellent anode characteristics over a long period of time.

9 Claims, No Drawings

POWDERY RAW MATERIAL FOR MANUFACTURING ANODES OF FUEL CELLS

BACKGROUND OF THE INVENTION

This invention relates to a powdery raw material for use as a starting material for manufacturing anodes of fuel cells, particularly fuel cells of the molten carbonate type, which enables to manufacture fuel cells having such excellent high-temperature creep strength and high sintering resistance as to maintain excellent anode characteristics over a long period of time.

Conventionally, in manufacturing an anode of a molten carbonate type fuel cell (hereinafter merely called "anode"), fine pure nickel powder is employed as the starting material which is generally prepared from nickel carbonyl through decarboxylation thereof and has a mean grain size of 2 microns or less. The fine pure nickel powder is formed into a predetermined shape by a doctor blade method, and then sintered. The sintered body is dipped in an aqueous solution of $(NO_3)_2$ of concentration of 0.1 mol %, then dried and thermally treated to form a chromium oxide layer over the surface of the sintered body to thus obtain an anode. An anode thus manufactured in general has a porous sintered body having a thickness of 1 mm, a porosity of 50-70%, and a mean pore diameter of 7-10 microns.

In the above conventional nickel anode, the chromium oxide layer coated over the sintered body acts to enhance the high-temperature creep strength and sintering resistance of the anode. However, this chromium oxide layer is not sufficient to enhance these properties to a satisfactory degree. As a result, if for example the anode is used under conditions that a load of 2-4 $Kg/cm^2$ is vertically applied on the anode surface and the temperature of the cell during operation is high, e.g. 650°-700° C. as usually applied, the anode undergoes gradual creep deformation and finally can be broken, which impedes diffusion of a fuel gas into the interior of the anode, resulting in a reduced reaction surface area of the anode and hence increased polarization of the cell, shortening the effective life of the cell.

The terms "creep strength" and "sintering resistance" are both parameters representative of shrinkage of the anode. The term "creep" macroscopically represents the anode shrinkage, i.e. it means an amount of change in the anode thickness, and the term "sintering" microscopically represents the anode shrinkage, i.e. it means a change in the microstructure of the anode. Fuel cells in general undergo gradual sintering and accordingly creep during operation. Since currently there is no suitable means for indicating the degree of sintering in fuel cells, usually the creep deformation is measured and the sintering degree is estimated from the measured creep deformation. Thus, the terms "creep" and "sintering" are synonymous with each other. As sintering grows in a fuel cell, i.e. the anode microstructure changes, it results in degraded cell performance. This degraded cell performance is particularly conspicuous in a stacked fuel cell which undergoes a large change in the total size of the cell due to creep. Therefore, to keep initial cell performance over a long period of time, it is desirable that no sintering and hence no creep should take place in fuel cells.

SUMMARY OF THE INVENTION

It is the object of the invention to provide a powdery raw material for anodes of fuel cells, particularly of the molten carbonate type, which enables to manufacture anodes which exhibit initial anode characteristics as excellent as those of conventional anodes, and possess such excellent high-temperature creep strength and sintering resistance that it is free from creep deformation over a long period of time, thereby exhibiting excellent anode characteristics over a long period of time.

To achieve the above object, the present invention provides a powdery raw material of a nickel-base alloy for manufacturing an anode of a fuel cell, comprising powder of a nickel-base alloy consisting essentially of 0.5-10 percent by weight aluminum, and the balance of nickel and inevitable impurities, and having a mean grain size of 3-20 microns.

Preferably, the nickel-base alloy powder contains 0.01-1.0 percent by weight oxygen.

Also preferably, the nickel-base alloy powder has an apparent density of 0.5-3.5 $g/cm^3$, and a specific surface area of at least 0.12 $m^2/g$.

Preferably, the nickel-base alloy powder is formed by means of water-atomization under a condition that the water injection pressure is 400 $Kg/cm^2$, and the specific water quantity is 0.02-0.2 $m^3/Kg$.

DETAILED DESCRIPTION

The present inventors have made many studies in order to develop an anode which exhibits initial anode characteristics as excellent as those of the aforementioned conventional pure nickel-formed anodes, over a long period of time, that is, an anode which possesses high high-temperature creep strength and sintering resistance as well as excellent anode characteristics, and have reached the following findings:

(1) If in place of fine pure nickel powder having a mean grain size of 2 microns or less conventionally employed as a powdery raw material for anodes of fuel cells, a powder of a nickel-base alloy having a composition of 0.5-10 percent by weight aluminum and the balance of nickel and inevitable impurities and having a relatively coarse mean grain size of 3-20 microns, the resulting anode composed of the sintered nickel-base alloy powder shows initial anode characteristics as excellent as the aforementioned conventional anode, and also possesses excellent high-temperature creep strength and sintering resistance even without coating the sintered body with a chromium oxide layer. As a result, the anode is free from deformation even after a long term use to ensure sufficient diffusion of a fuel gas into the interior of the anode which would be impeded if the anode is deformed, thereby exhibiting excellent anode characteristics over a long period of time.

(2) If oxygen is contained in an amount of 0.01-1.0 percent in the nickel-base alloy powder having the above-mentioned composition and mean grain size, the resulting anode composed of such oxygen-containing nickel-base alloy powder has fine aluminum oxide particles having a grain size of 1 micron or less dispersed in the nickel-base alloy matrix. The dispersed aluminum oxide particles act to further enhance the high-temperature creep strength and sintering resistance.

(3) The nickel-base alloy powder employed as the starting powdery raw material should desirably have an apparent density of 0.3-3.5 $g/cm^3$ and a specific surface area of 0.12 $m^2/g$ or more. Further, a nickel-base alloy powder having such apparent density and specific surface area should preferably be manufactured in the following manner: Molten metal of a nickel-base alloy having a composition according to the invention is prepared in vacuum, and then the molten metal is pulverized by a water atomization method. To be specific, the molten metal poured into a crucible is caused to flow downward through a molten metal nozzle mounted at the bottom of the crucible, and at the same time water is injected against the downwardly flowing molten metal under high pressure in the form of a hollow inverted cone through a circular slit of an injection nozzle arranged concentrically around a nozzle hole of the molten metal nozzle, so that the molten metal is struck by the apex of the inverted conical water jet to be pulverized and at the same time the pulverized molten metal is quenched and solidified by the water jet. If the water injection pressure is 400 Kg/cm$^2$ or more, and the specific water quantity defined as the quantity of water used for the manufacture of the nickel-base alloy powder - the weight (Kg) of powder manufactured falls within a range of 0.02–0.2 m$^3$/Kg, a yield of 70 percent or more can be attained.

The present invention is based upon the above findings. A powdery raw material for manufacturing an anode of a fuel cell comprises powder of a nickel-base alloy having the aforesaid composition, mean grain size, apparent density, and specific surface area. The nickel-base alloy powder is preferably manufactured by a water-atomization method under the aforedescribed conditions.

In the powdery raw material according to the invention, the aluminum content has been limited to 0.5–10 percent by weight for the following reason: If the aluminum content is less than 0.5 percent by weight, the resulting anode cannot have desired high-temperature creep strength, whereas if the aluminum content exceeds 10 percent by weight, there can be a degradation in the anode characteristics. A preferable range of the aluminum content is 2–5 percent by weight.

The reason why the mean grain size has been limited to 3–20 microns is as follows: If the mean grain size is less than 3 microns, it cannot be assured that the resulting anode has desired high-temperature creep strength even if aluminum is contained in the nickel-base alloy powder within the above specified range, whereas if the mean grain size is in excess of 20 microns, a porous sintered body forming the anode has too small a specific surface area, which results in a reduced anode reaction surface area and hence difficulty to obtain desired anode characteristics. A preferable range of the mean grain size is 5–15 microns.

Oxygen may be contained in the nickel-base alloy powder according to the invention within a range of 0.01–1 percent by weight in addition to aluminum in order to enhance the high-temperature creep strength and sintering resistance of the resulting anode. If the oxygen content is less than 0.01 percent by weight, the aluminum oxide particles dispersed in the matrix is too small in number to enhance the above properties to a desired extent. If the oxygen content exceeds 1 percent by weight, a film of aluminum oxide will be formed over the surfaces of the nickel-base alloy powder particles, greatly degrading the sinterability of the powder. A preferable range of the oxygen content is 0.1–0.5 percent by weight.

As stated before, the nickel-base alloy powder according to the invention should desirably have an apparent density of 0.5–3.5 g/cm$^3$ and a specific surface area of 0.12 m$^2$/g. If the apparent density is less than 0.5 g/cm$^3$, the resulting anode has too high a porosity and hence degraded mechanical strength, making it difficult to handle the anode, e.g. transport or work same. An anode of this kind should preferably have a porosity of 55–70 percent and a specific surface area of 0.1 m$^2$/g or more so as to exhibit satisfactory anode characteristics. On the other hand, if the apparent density exceeds 3.5 g/cm$^3$, the porosity of the resulting anode is so small that the gas diffusion resistance increases, making it impossible to obtain desired anode resistance. As regards the specific surface area, the performance of the anode is commensurate with the reaction surface area of the anode which is closely dependent upon the specific surface area of the anode. That is, in general, the larger the specific surface area, the more excellent performance the anode exhibits. Therefore, to attain desired anode performance, the specific surface area of the anode should be 0.1 m$^2$/g or more as stated before. To manufacture an anode having a specific surface area satisfying this range, it is required for the nickel-base alloy powder to have a specific surface area of at least 0.12 m$^2$. Best results can be obtained if the apparent density is 1–3 g/cm$^3$, and the specific surface area is 0.2–2 m$^2$/g.

It is desirable that nickel-base alloy powder for fuel cells, which satisfies the above stated requirements in respect of mean grain size, apparent density, and specific surface area, should be prepared by means of a water-atomization method. In the water-atomization method, the water injection pressure should be high enough to cause the molten metal flow to be reduced to very small particles. The water injection pressure should be 400 Kg/cm$^2$ or more, otherwise powder having desired particle configuration cannot be obtained. Further, as to the specific water quantity which affects the cooling rate of the pulverized molten metal particles, if its value is less than 0.02 mm$^3$/Kg, the cooling rate is so small that the pulverized molten metal particles can become agglomerated and solidified, thus failing to manufacture power having desired particle configuration with a high yield. On the other hand, if the specific water quantity is more than 0.2 mm$^3$/Kg, the increased quantity of water used for the manufacture of powder leads to an increased manufacturing cost. Therefore, the specific water quantity should be within a range of 0.02–0.2 mm$^3$/Kg, and preferably 0.05–0.15 mm$^3$/Kg.

In preparing molten metal for nickel-base alloy powder according to the invention, a deoxidizer may be used such as Ca, Mg, Cr, Fe, Co, Si, and rare-earth elements. Therefore, the nickel-base alloy powder according to the invention may contain one or more of these elements as inevitable impurities. However, if the total percentage of these inevitable impurities is less than 1 percent by weight, they will not badly affect the manufacture of the anode and the properties thereof. Further, the oxygen content in the powder to be manufactured may be controlled by selecting the kind and added amount of the deoxidizer.

Examples of the powdery raw material for manufacturing an anode according to the invention will now be described in detail.

EXAMPLE

Molten metals of nickel-base alloys having respective compositions shown in Table were prepared in vacuum. Each molten metal was poured into a crucible having a molten metal nozzle mounted at its bottom and caused to flow downward through the nozzle in an atmosphere of argon gas, and at the same time water was injected against the downwardly flowing molten metal under high pressure in the form of a hollow inverted cone through a circular slit of an injection nozzle arranged concentrically around a nozzle hole of the molten metal nozzle, so that the molten metal was struck by the apex of the inverted conical water jet to be pulverized and at the same time the pulverized molten metal was quenched and solidified by the water jet, to obtain nickel-base alloy powders Nos. 1–4 according to the present invention and comparative ones Nos. 1–3 having respective mean grain sizes, specific surface areas, and apparent densities shown in Table. The comparative nickel-base alloy powders Nos. 1–3 each have at least one of the grain size, specific surface area, and apparent density falling outside the range of the present invention.

Then, anodes were prepared from these nickel-base alloy powders in the following manner: polyvinyl butyral (PVB) as an organic binder, an mixed solution of toluene and ethanol having a weight ratio of 1:1 between toluene and ethanol as a solvent, polyethylene glycol as a plasticizer, and methyl oleate as a peptizer, and each of the above nickel-base alloy powders were blended together such that the weight ratio between the nickel-base alloy powder: PVB: solvent: plasticizer: peptizer is 90:2:10:2:1. The blended material was then agitated into a slurry. The slurry was applied over a carrier tape in the form of a uniform sheet having a thickness of 1 mm, by means of a doctor blade method. The sheet applied over the carrier tape was dried by an ultra-red ray dryer so as to evaporate the solvent and solidify the sheet. The dried and solidified sheet was soaked in vacuum at a temperature of 500° C. and for 30 minutes to have the organic binder removed therefrom. Then, the sheet was sintered in vacuum at a temperature of 1000° C. and for 4 hours, to obtain an anode.

Besides anodes prepared from the above-mentioned nickel-base alloy powders, a conventional anode was prepared from a pure nickel powder obtained from carbonyl nickel which is conventionally employed in manufacturing anodes (shown as Conventional Nickel Powder in Table), under the same conditions as those applied to the anodes obtained from the above-mentioned nickel-base alloy powders except that a sintered body obtained from the pure nickel powder was dipped in an aqueous solution of $Cr(NO_3)_2$ of concentration of 0.1 mol %, then the dipped sintered body was dried, and the dried sintered body was soaked in a $CO_2$ atmosphere at a temperature of 700° C. and for 1 hour to have its surface formed with a chromium oxide layer.

The anodes thus prepared were each incorporated into a molten carbonate type fuel cell having a single cell which is constructed as below:
Frame: Stainless steel SUS316 according to JIS (Japan Industrial Standard);
Collector Plate of Cathode: Perforated Plate formed of Stainless Steel SUS316;
Collector Plate of Anode: Net formed of copper;
Cathode: Porous NiO sintered body;

TABLE

| | POWDER CHARACTERISTICS | | | | | |
|---|---|---|---|---|---|---|
| | COMPOSITION (WT %) | | | MEAN GRAIN SIZE ($\mu m$) | SPECIFIC SURFACE AREA ($m^2/g$) | APPARENT DENSITY ($g/cm^3$) |
| SPECIMENS | Al | OXYGEN | Ni + INEVITABLE IMPURITIES | | | |
| Ni-BASE ALLOY POWDERS ACCORDING TO THE PRESENT INVENTION | | | | | | |
| 1 | 0.55 | <0.01 | bal. | 5.8 | 0.42 | 1.0 |
| 2 | 3.21 | 0.25 | " | 9.4 | 0.31 | 1.6 |
| 3 | 6.46 | <0.01 | " | 19.1 | 0.13 | 3.3 |
| 4 | 9.23 | 0.96 | " | 3.2 | 0.55 | 0.6 |
| COMPARATIVE Ni-BASE ALLOY POWDERS | | | | | | |
| 1 | 0.31* | <0.01 | " | 6.2 | 0.38 | 1.5 |
| 2 | 14.32* | 0.28 | " | 9.0 | 0.32 | 2.0 |
| 3 | 5.14 | 0.88 | " | 25.6* | 0.10* | 3.8* |
| CONVENTIONAL PURE Ni POWDER | —* | <0.01 | " | 1.9* | 0.59 | 1.1 |

| | ANODE CHARACTERISTICS | | | | |
|---|---|---|---|---|---|
| | AFTER LAPSE OF 100 hr | | AFTER LAPSE OF 1000 hr | | AMOUNT OF CHANGE IN ANODE THICKNESS (%) |
| SPECIMENS | OPEN-CIRCUIT OUTPUT VOLTAGE (V) | LOADED OUTPUT VOLTAGE (V) | OPEN-CIRCUIT OUTPUT VOLTAGE (V) | LOADED OUTPUT VOLTAGE (V) | |
| Ni-BASE ALLOY POWDERS ACCORDING TO THE PRESENT INVENTION | | | | | |
| 1 | 1.052 | 0.805 | 1.101 | 0.800 | 2.9 |
| 2 | 1.053 | 0.807 | 1.103 | 0.805 | 1.9 |
| 3 | 1.053 | 0.807 | 1.102 | 0.801 | 3.1 |
| 4 | 1.052 | 0.806 | 1.102 | 0.806 | 1.6 |
| COMPARATIVE Ni-BASE ALLOY POWDERS | | | | | |
| 1 | 1.052 | 0.801 | 1.101 | 0.748 | 6.8 |
| 2 | 1.051 | 0.781 | 1.100 | 0.743 | 7.9 |
| 3 | 1.052 | 0.702 | 1.102 | 0.692 | 7.5 |
| CONVENTIONAL PURE Ni POWDER | 1.053 | 0.806 | 1.103 | 0.789 | 4.5 |

*falls outside the range of the present invention

Electrolyte Plate: Hot pressed body prepared from a mixed powder having a composition of 40% by weight $LiAlO_2$ powder, 28% by weight $Li_2CO_3$ powder, and 32% by weight $K_2CO_3$ powder in such a manner that the mixed powder was charged into a mold having a predetermined shape and was soaked in vacuum under a pressure of 300 $Kg/cm^2$ at a temperature of 400° C. and for 4 hours; and Electrode Area: 10 $cm^2$ Then, the fuel cell was operated continuously under a condition that the operating temperature is 650° C. and the output current density is 150 $mA/cm^2$ with the anode supplied with a fuel gas having a composition of 78% by volume $H_2$, 20% by volume $CO_2$, and 2% by volume $H_2O$ was supplied to the anode, and the cathode with a deoxizer gas having a composition of 80% by volume air, and 20% by volume $CO_2$, respectively. The open circuit output voltage and the loaded output voltage were measured upon the lapse of 100 hours and 1000 hours from the start of operation. The loaded output voltage was obtained by applying an electric load on the fuel cell by means of an electronic resistive load device so as to make the output current density 150 $mA/cm^2$. Also an amount of change in the thickness of the anode was measured upon the lapse of 1000 hours from the start of operation. The results of these measurements are shown in Table.

It will be learned from Table that the anode made from the conventional pure nickel powder undergoes relatively large deformation so that the cell characteristics, e.g. the loaded output voltage drops with the lapse of time, whereas the anodes made from the nickel-base alloy powders Nos 1-4 according to the present invention undergo almost no deformation even after the lapse of a long period of time and therefore excellent cell charactertistics almost the same as the initial ones are shown even after the lapse of a long period of time.

It should be noted from Table that the anodes made from the comparative nickel-base alloy powders Nos. 1-3, each of which has at least one of the aluminum content, mean grain size, specific surface area, and apparent density falling outside the range of the present invention, undergo large deformation and do not show required excellent anode characteristics so that excellent cell characteristics cannot be exhibited over a long period of time.

As described above, if nickel-base alloy powders according to the invention are employed as starting powdery raw material, anodes of fuel cells can be manufactured without fail, which are almost free from deformation even after a long term operation and can enable the cells to exhibit excellent cell characteristics over a long period of time.

What is claimed is:

1. A powdery raw material of a nickel-base alloy for manufacturing a porous sintered anode of a fuel cell, comprising a powder of a nickel-base alloy consisting essentially of 0.5-10 percent by weight aluminum, a small amount up to 1 percent by weight oxygen effective to produce fine aluminum oxide particles having a particle size less than 1 micron in the matrix of said alloy and the balance of nickel and inevitable impurities, and having a mean grain size of 3-20 microns.

2. The powdery raw material as claimed in claim 1, wherein said nickel-base alloy powder contains 0.01-1.0 percent by weight oxygen.

3. The powdery raw material as claimed in claim 1, wherein said nickel-base alloy powder has an apparent density of 0.5-3.5 $g/cm^3$, and a specific surface area of at least 0.12 $m^2/g$.

4. The powdery raw material as claimed in claim 1, wherein said nickel-base alloy powder is formed by means of water-atomization under a condition that the water injection pressure is at least 400 $Kg/cm^2$, and specific water quantity is 0.02-0.2 $mm^3/Kg$.

5. The powdery raw material as claimed in claim 1, having an oxygen content of 0.1% to 0.5% by weight.

6. The powdery raw material as claimed in claim 5, having an aluminum content of 2% to 5% by weight.

7. The powdery raw material as claimed in claim 6, having an apparent density of 1 to 3 $grams/cm^3$ and a specific surface area of 0.2 to 2 $m^2/gram$.

8. The powdery raw material as claimed in claim 7, having a mean grain size of 5-15 microns.

9. The powdery raw material as claimed in claim 4, wherein said specific water quantity is 0.05-0.15 $m^3/Kg$.

* * * * *